(12) United States Patent
Kapczynski et al.

(10) Patent No.: US 8,478,674 B1
(45) Date of Patent: Jul. 2, 2013

(54) APPLICATION CLUSTERS

(75) Inventors: Mark Joseph Kapczynski, Santa Monica, CA (US); Michael John Dean, Torrance, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 13/250,453

(22) Filed: Sep. 30, 2011

Related U.S. Application Data

(60) Provisional application No. 61/413,294, filed on Nov. 12, 2010.

(51) Int. Cl.
*G06Q 40/00* (2012.01)

(52) U.S. Cl.
USPC .......................................................... 705/35

(58) Field of Classification Search
USPC .................................................... 705/30–45
See application file for complete search history.

(56) References Cited

U.S. PATENT DOCUMENTS

| | | |
|---|---|---|
| 5,590,038 A | 12/1996 | Pitroda |
| 5,640,577 A | 6/1997 | Scharmer |
| 5,659,731 A | 8/1997 | Gustafson |
| 5,692,107 A | 11/1997 | Simoudis et al. |
| 5,754,939 A | 5/1998 | Herz et al. |
| 5,822,751 A | 10/1998 | Gray et al. |
| 5,825,884 A | 10/1998 | Zdepski et al. |
| 5,828,837 A | 10/1998 | Eikland |
| 5,832,068 A | 11/1998 | Smith |
| 5,844,218 A | 12/1998 | Kawan et al. |
| 5,881,131 A | 3/1999 | Farris et al. |
| 5,956,693 A | 9/1999 | Geerlings |
| 5,961,593 A | 10/1999 | Gabber et al. |
| 6,038,551 A | 3/2000 | Barlow et al. |
| 6,070,147 A | 5/2000 | Harms et al. |
| 6,073,106 A | 6/2000 | Rozen et al. |
| 6,073,140 A | 6/2000 | Morgan et al. |

(Continued)

FOREIGN PATENT DOCUMENTS

| | | |
|---|---|---|
| JP | 10-222559 | 8/1998 |
| JP | 10-261009 | 9/1998 |

(Continued)

OTHER PUBLICATIONS

U.S. Appl. No. 12/705,489, filed Feb. 12, 2010, Bargoli et al.

(Continued)

*Primary Examiner* — Thomas M Hammond, III
(74) *Attorney, Agent, or Firm* — Knobbe, Martens, Olson & Bear LLP

(57) ABSTRACT

One or more application providers supply primary data and user interface rendering information to a computing system. The computing system comprises modules that mange the received data and generate a user interface using the received rendering information. Data may be managed by resolving conflicts in the primary data as between the one or more application providers. Data may also be managed through the creation of derived data based at least in part on the received primary data. A user interface may be generated that has several applications displayed in an application cluster. The applications may be generated based on the rendering information. A user may interact with the user interface and may be able to edit the primary data. If the primary data is modified, the computing system communicates the modifications to the one or more application providers that supplied the original, primary data.

12 Claims, 10 Drawing Sheets

U.S. PATENT DOCUMENTS

| | | |
|---|---|---|
| 6,128,602 A | 10/2000 | Northington et al. |
| 6,157,927 A | 12/2000 | Schaefer et al. |
| 6,253,202 B1 | 6/2001 | Gilmour |
| 6,254,000 B1 | 7/2001 | Degen et al. |
| 6,405,173 B1 | 6/2002 | Honarvar |
| 6,446,200 B1 | 9/2002 | Ball et al. |
| 6,457,012 B1 | 9/2002 | Jatkowski |
| 6,463,533 B1 | 10/2002 | Calamera et al. |
| 6,523,022 B1 | 2/2003 | Hobbs |
| 6,523,041 B1 | 2/2003 | Morgan et al. |
| 6,581,059 B1 | 6/2003 | Barrett et al. |
| 6,601,173 B1 | 7/2003 | Mohler |
| 6,748,426 B1 | 6/2004 | Shaffer et al. |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,804,346 B1 | 10/2004 | Mewhinney |
| 6,845,448 B1 | 1/2005 | Chaganti et al. |
| 6,871,287 B1 | 3/2005 | Ellingson |
| 6,910,624 B1 | 6/2005 | Natsuno |
| 6,934,714 B2 | 8/2005 | Meinig |
| 6,950,858 B2 | 9/2005 | Ogami |
| 6,954,757 B2 | 10/2005 | Zargham et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 7,028,001 B1 | 4/2006 | Muthuswamy et al. |
| 7,028,013 B2 | 4/2006 | Saeki |
| 7,028,052 B2 | 4/2006 | Chapman et al. |
| 7,035,855 B1 | 4/2006 | Kilger et al. |
| 7,046,139 B2 | 5/2006 | Kuhn et al. |
| 7,047,251 B2 | 5/2006 | Reed et al. |
| 7,050,989 B1 | 5/2006 | Hurt et al. |
| 7,076,475 B2 | 7/2006 | Honarvar |
| 7,133,935 B2 | 11/2006 | Hedy |
| 7,184,974 B2 | 2/2007 | Shishido |
| 7,185,016 B1 | 2/2007 | Rasmussen |
| 7,200,602 B2 | 4/2007 | Jonas |
| 7,209,895 B2 | 4/2007 | Kundtz et al. |
| 7,234,156 B2 | 6/2007 | French et al. |
| 7,234,160 B2 | 6/2007 | Vogel et al. |
| 7,246,067 B2 | 7/2007 | Austin et al. |
| 7,246,740 B2 | 7/2007 | Swift et al. |
| 7,249,048 B1 | 7/2007 | O'Flaherty |
| 7,272,591 B1 | 9/2007 | Ghazal et al. |
| 7,333,976 B1 | 2/2008 | Auerbach et al. |
| 7,356,516 B2 | 4/2008 | Richey et al. |
| 7,370,044 B2 | 5/2008 | Mulhern et al. |
| 7,383,988 B2 | 6/2008 | Slonecker, Jr. |
| 7,403,942 B1 | 7/2008 | Bayliss |
| 7,433,864 B2 | 10/2008 | Malik |
| 7,451,113 B1 | 11/2008 | Kasower |
| 7,458,508 B1 | 12/2008 | Shao et al. |
| 7,460,857 B2 | 12/2008 | Roach, Jr. |
| 7,478,157 B2 | 1/2009 | Bohrer et al. |
| 7,503,489 B2 | 3/2009 | Heffez |
| 7,509,117 B2 | 3/2009 | Yum |
| 7,512,221 B2 | 3/2009 | Toms |
| 7,529,698 B2 | 5/2009 | Joao |
| 7,536,346 B2 | 5/2009 | Aliffi et al. |
| 7,542,993 B2 | 6/2009 | Satterfield et al. |
| 7,548,886 B2 | 6/2009 | Kirkland et al. |
| 7,575,157 B2 | 8/2009 | Barnhardt et al. |
| 7,587,366 B2 | 9/2009 | Grim, III et al. |
| 7,594,019 B2 | 9/2009 | Clapper |
| 7,596,512 B1 | 9/2009 | Raines et al. |
| 7,596,716 B2 | 9/2009 | Frost et al. |
| 7,603,701 B2 | 10/2009 | Gaucas |
| 7,606,725 B2 | 10/2009 | Robertson et al. |
| 7,610,216 B1 | 10/2009 | May et al. |
| 7,620,596 B2 | 11/2009 | Knudson et al. |
| 7,623,844 B2 | 11/2009 | Herrmann et al. |
| 7,653,600 B2 | 1/2010 | Gustin |
| 7,668,725 B2 | 2/2010 | Alston |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,689,487 B1 | 3/2010 | Britto et al. |
| 7,689,505 B2 | 3/2010 | Kasower |
| 7,690,032 B1 | 3/2010 | Peirce |
| 7,698,445 B2 | 4/2010 | Fitzpatrick et al. |
| 7,707,122 B2 | 4/2010 | Hull et al. |
| 7,708,190 B2 | 5/2010 | Brandt et al. |
| 7,739,139 B2 | 6/2010 | Robertson et al. |
| 7,739,707 B2 | 6/2010 | Sie et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,761,384 B2 | 7/2010 | Madhogarhia |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,270 B1 | 8/2010 | MacCloskey |
| 7,787,869 B2 | 8/2010 | Rice et al. |
| 7,792,715 B1 | 9/2010 | Kasower |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,797,725 B2 | 9/2010 | Lunt et al. |
| 7,809,797 B2 | 10/2010 | Cooley et al. |
| 7,814,005 B2 | 10/2010 | Imrey et al. |
| 7,818,228 B1 | 10/2010 | Coulter |
| 7,841,004 B1 | 11/2010 | Balducci et al. |
| 7,841,008 B1 | 11/2010 | Cole et al. |
| 7,849,014 B2 | 12/2010 | Erikson |
| 7,853,493 B2 | 12/2010 | DeBie et al. |
| 7,912,865 B2 | 3/2011 | Akerman et al. |
| 7,970,679 B2 | 6/2011 | Kasower |
| 7,983,932 B2 | 7/2011 | Kane |
| 7,996,912 B2 | 8/2011 | Spalink et al. |
| 8,005,759 B2 | 8/2011 | Hirtenstein et al. |
| 8,024,264 B2 | 9/2011 | Chaudhuri et al. |
| 8,078,453 B2 | 12/2011 | Shaw |
| 8,095,458 B2 | 1/2012 | Peterson et al. |
| 8,099,341 B2 | 1/2012 | Varghese |
| 8,127,986 B1 | 3/2012 | Taylor et al. |
| 8,195,549 B2 | 6/2012 | Kasower |
| 8,234,498 B2 | 7/2012 | Britti et al. |
| 8,285,656 B1 | 10/2012 | Chang et al. |
| 8,312,033 B1 | 11/2012 | McMillan |
| 8,321,952 B2 | 11/2012 | Spalink et al. |
| 8,392,334 B2 | 3/2013 | Hirtenstein et al. |
| 2001/0011245 A1 | 8/2001 | Duhon |
| 2001/0049620 A1 | 12/2001 | Blasko |
| 2002/0004736 A1 | 1/2002 | Roundtree et al. |
| 2002/0026507 A1 | 2/2002 | Sears et al. |
| 2002/0026519 A1 | 2/2002 | Itabashi et al. |
| 2002/0035684 A1 | 3/2002 | Vogel et al. |
| 2002/0069122 A1 | 6/2002 | Yun et al. |
| 2002/0077964 A1 | 6/2002 | Brody et al. |
| 2002/0082892 A1 | 6/2002 | Raffel et al. |
| 2002/0099628 A1 | 7/2002 | Takaoka et al. |
| 2002/0099824 A1 | 7/2002 | Bender et al. |
| 2002/0103809 A1 | 8/2002 | Starzl et al. |
| 2002/0120776 A1 | 8/2002 | Eggebraaten et al. |
| 2002/0128962 A1 | 9/2002 | Kasower |
| 2002/0133504 A1 | 9/2002 | Vlahos et al. |
| 2002/0156676 A1 | 10/2002 | Ahrens et al. |
| 2002/0169747 A1 | 11/2002 | Chapman et al. |
| 2002/0188544 A1 | 12/2002 | Wizon et al. |
| 2002/0198824 A1 | 12/2002 | Cook |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0061163 A1 | 3/2003 | Durfield |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0115133 A1 | 6/2003 | Bian |
| 2003/0171942 A1 | 9/2003 | Gaito |
| 2003/0195859 A1 | 10/2003 | Lawrence |
| 2003/0212654 A1 | 11/2003 | Harper et al. |
| 2003/0229892 A1 | 12/2003 | Sardera |
| 2004/0006488 A1 | 1/2004 | Fitall et al. |
| 2004/0010458 A1 | 1/2004 | Friedman |
| 2004/0030649 A1 | 2/2004 | Nelson et al. |

| | | |
|---|---|---|
| 2004/0044628 A1 | 3/2004 | Mathew et al. |
| 2004/0098625 A1 | 5/2004 | Lagadec et al. |
| 2004/0103147 A1 | 5/2004 | Flesher et al. |
| 2004/0111359 A1 | 6/2004 | Hudock |
| 2004/0117358 A1 | 6/2004 | Von Kaenel et al. |
| 2004/0128150 A1 | 7/2004 | Lundegren |
| 2004/0139025 A1 | 7/2004 | Coleman |
| 2004/0153330 A1 | 8/2004 | Miller et al. |
| 2004/0153521 A1 | 8/2004 | Kogo |
| 2004/0167793 A1 | 8/2004 | Masuoka et al. |
| 2004/0193891 A1 | 9/2004 | Ollila |
| 2004/0199456 A1 | 10/2004 | Flint et al. |
| 2004/0199789 A1 | 10/2004 | Shaw et al. |
| 2004/0225594 A1 | 11/2004 | Nolan, III et al. |
| 2004/0230527 A1 | 11/2004 | Hansen et al. |
| 2005/0005168 A1 | 1/2005 | Dick |
| 2005/0027983 A1 | 2/2005 | Klawon |
| 2005/0027995 A1 | 2/2005 | Menschik et al. |
| 2005/0055231 A1 | 3/2005 | Lee |
| 2005/0058262 A1 | 3/2005 | Timmins et al. |
| 2005/0137899 A1 | 6/2005 | Davies et al. |
| 2005/0154665 A1 | 7/2005 | Kerr |
| 2005/0192008 A1 | 9/2005 | Desai et al. |
| 2005/0288998 A1 | 12/2005 | Verma et al. |
| 2006/0020611 A1 | 1/2006 | Gilbert et al. |
| 2006/0041464 A1 | 2/2006 | Powers et al. |
| 2006/0059110 A1 | 3/2006 | Madhok et al. |
| 2006/0074986 A1 | 4/2006 | Mallalieu et al. |
| 2006/0074991 A1 | 4/2006 | Lussier et al. |
| 2006/0129481 A1 | 6/2006 | Bhatt et al. |
| 2006/0155573 A1 | 7/2006 | Hartunian |
| 2006/0161435 A1 | 7/2006 | Atef et al. |
| 2006/0178971 A1 | 8/2006 | Owen et al. |
| 2006/0184440 A1 | 8/2006 | Britti et al. |
| 2006/0229943 A1 | 10/2006 | Mathias et al. |
| 2006/0229961 A1 | 10/2006 | Lyftogt et al. |
| 2006/0242047 A1 | 10/2006 | Haggerty et al. |
| 2006/0253323 A1 | 11/2006 | Phan et al. |
| 2006/0253358 A1 | 11/2006 | Delgrosso et al. |
| 2006/0262929 A1 | 11/2006 | Vatanen et al. |
| 2006/0271457 A1 | 11/2006 | Romain et al. |
| 2006/0271472 A1 | 11/2006 | Cagan |
| 2006/0282359 A1 | 12/2006 | Nobili et al. |
| 2007/0005508 A1 | 1/2007 | Chiang |
| 2007/0022297 A1 | 1/2007 | Britti et al. |
| 2007/0027816 A1 | 2/2007 | Writer |
| 2007/0038483 A1 | 2/2007 | Wood |
| 2007/0038497 A1 | 2/2007 | Britti et al. |
| 2007/0067297 A1 | 3/2007 | Kublickis |
| 2007/0067437 A1 | 3/2007 | Sindambiwe |
| 2007/0073889 A1 | 3/2007 | Morris |
| 2007/0078985 A1 | 4/2007 | Shao et al. |
| 2007/0083460 A1 | 4/2007 | Bachenheimer |
| 2007/0112667 A1 | 5/2007 | Rucker |
| 2007/0118393 A1 | 5/2007 | Rosen et al. |
| 2007/0124256 A1 | 5/2007 | Crooks et al. |
| 2007/0156554 A1 | 7/2007 | Nikoley et al. |
| 2007/0160458 A1 | 7/2007 | Yen |
| 2007/0174122 A1 | 7/2007 | Howard et al. |
| 2007/0174186 A1 | 7/2007 | Hokland |
| 2007/0174448 A1 | 7/2007 | Ahuja et al. |
| 2007/0220611 A1 | 9/2007 | Socolow et al. |
| 2007/0250459 A1 | 10/2007 | Schwarz et al. |
| 2007/0261114 A1 | 11/2007 | Pomerantsev |
| 2007/0282730 A1 | 12/2007 | Carpenter et al. |
| 2007/0282736 A1 | 12/2007 | Conlin et al. |
| 2007/0288355 A1 | 12/2007 | Roland et al. |
| 2007/0288360 A1 | 12/2007 | Seeklus |
| 2007/0299759 A1 | 12/2007 | Kelly |
| 2008/0010206 A1 | 1/2008 | Coleman |
| 2008/0010687 A1 | 1/2008 | Gonen et al. |
| 2008/0028067 A1 | 1/2008 | Berkhin et al. |
| 2008/0033742 A1 | 2/2008 | Bernasconi |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0071682 A1 | 3/2008 | Dominguez |
| 2008/0103972 A1 | 5/2008 | Lanc |
| 2008/0109875 A1 | 5/2008 | Kraft |
| 2008/0115191 A1 | 5/2008 | Kim et al. |
| 2008/0120569 A1* | 5/2008 | Mann et al. .................. 715/792 |
| 2008/0175360 A1 | 7/2008 | Schwarz et al. |
| 2008/0183480 A1 | 7/2008 | Carlson et al. |
| 2008/0183504 A1 | 7/2008 | Highley |
| 2008/0205655 A1 | 8/2008 | Wilkins et al. |
| 2008/0208873 A1 | 8/2008 | Boehmer |
| 2008/0228775 A1 | 9/2008 | Abhyanker et al. |
| 2008/0255992 A1 | 10/2008 | Lin |
| 2008/0263058 A1 | 10/2008 | Peden |
| 2008/0270209 A1 | 10/2008 | Mauseth et al. |
| 2008/0281737 A1 | 11/2008 | Fajardo |
| 2008/0282324 A1 | 11/2008 | Hoal |
| 2008/0288299 A1 | 11/2008 | Schultz |
| 2008/0301016 A1 | 12/2008 | Durvasula et al. |
| 2008/0306750 A1 | 12/2008 | Wunder et al. |
| 2008/0319889 A1 | 12/2008 | Hammad |
| 2009/0006230 A1 | 1/2009 | Lyda et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055894 A1 | 2/2009 | Lorsch |
| 2009/0094674 A1 | 4/2009 | Schwartz et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0126013 A1 | 5/2009 | Atwood et al. |
| 2009/0138335 A1 | 5/2009 | Lieberman |
| 2009/0150166 A1 | 6/2009 | Leite et al. |
| 2009/0150238 A1 | 6/2009 | Marsh et al. |
| 2009/0164380 A1 | 6/2009 | Brown |
| 2009/0177529 A1 | 7/2009 | Hadi |
| 2009/0177670 A1 | 7/2009 | Grenier et al. |
| 2009/0210241 A1 | 8/2009 | Calloway |
| 2009/0217342 A1 | 8/2009 | Nadler |
| 2009/0228918 A1* | 9/2009 | Rolff et al. .................. 725/34 |
| 2009/0234665 A1 | 9/2009 | Conkel |
| 2009/0249451 A1 | 10/2009 | Su et al. |
| 2009/0260064 A1 | 10/2009 | Mcdowell et al. |
| 2009/0307778 A1 | 12/2009 | Mardikar |
| 2009/0327054 A1 | 12/2009 | Yao et al. |
| 2009/0328173 A1 | 12/2009 | Jakobson et al. |
| 2010/0043055 A1 | 2/2010 | Baumgart |
| 2010/0094758 A1 | 4/2010 | Chamberlain et al. |
| 2010/0114744 A1 | 5/2010 | Gonen |
| 2010/0114776 A1 | 5/2010 | Weller et al. |
| 2010/0145840 A1 | 6/2010 | Kasower |
| 2010/0153278 A1 | 6/2010 | Farsedakis |
| 2010/0169159 A1 | 7/2010 | Rose et al. |
| 2010/0174813 A1 | 7/2010 | Hildreth et al. |
| 2010/0179906 A1 | 7/2010 | Hawkes |
| 2010/0241535 A1 | 9/2010 | Nightingale et al. |
| 2010/0250411 A1 | 9/2010 | Ogrodski |
| 2010/0257577 A1 | 10/2010 | Grandison et al. |
| 2010/0280914 A1 | 11/2010 | Carlson |
| 2011/0016042 A1 | 1/2011 | Cho et al. |
| 2011/0029388 A1 | 2/2011 | Kendall et al. |
| 2011/0035788 A1 | 2/2011 | White et al. |
| 2011/0040629 A1 | 2/2011 | Chiu et al. |
| 2011/0060905 A1 | 3/2011 | Stack et al. |
| 2011/0071950 A1 | 3/2011 | Ivanovic |
| 2011/0137760 A1 | 6/2011 | Rudie et al. |
| 2011/0164746 A1 | 7/2011 | Nice et al. |
| 2011/0166988 A1 | 7/2011 | Coulter |
| 2011/0219421 A1 | 9/2011 | Ullman et al. |
| 2012/0016948 A1 | 1/2012 | Sinha |
| 2012/0047219 A1 | 2/2012 | Feng et al. |
| 2012/0110677 A1 | 5/2012 | Abendroth et al. |
| 2012/0124498 A1* | 5/2012 | Santoro et al. ............... 715/765 |
| 2012/0173339 A1* | 7/2012 | Flynt et al. .................. 705/14.58 |
| 2012/0303514 A1 | 11/2012 | Kasower |

FOREIGN PATENT DOCUMENTS

| | | |
|---|---|---|
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |

| | | |
|---|---|---|
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| WO | WO 01/84281 | 11/2001 |
| WO | WO 2004/114160 | 12/2004 |
| WO | WO 2008/022289 | 2/2008 |
| WO | WO 2008/054403 | 5/2008 |
| WO | WO 2009/117518 | 9/2009 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |

OTHER PUBLICATIONS

U.S. Appl. No. 12/705,511, filed Feb. 12, 2010, Bargoli et al.
"Aggregate and Analyze Social Media Content:Gain Faster and Broader Insight to Market Sentiment"; SAP Partner; Mantis Technology Group; pp. 4; Apr. 2011.
Chores & Allowances. "Do Kids Have Credit Reports?", Oct. 15, 2007, http://choresandallowances.blogspot.com/2007/10/do-kids-have-credit-reports.html.
"Debt Settlement: Watch Video on how to Pay Your Debt Faster", http://www.debtconsolidationcare.com/debt-settlement.html printed Jan. 9, 2013 in 6 pages.
Ettorre, Paul Kahn on Exceptional Marketing. Management Review, vol. 38(11), Nov. 1994, pp. 48-51.
Gibbs, Adrienne; "Protecting Your Children from Identity Theft," Nov. 25, 2008, http://www.creditcards.com/credit-card-news/identity-ID-theft-and-kids-children-1282.php.
ID Theft Assist, "Do You Know Where Your Child's Credit Is?", Nov. 26, 2007, http://www.idtheftassist.com/pages/story14.
Ideon, Credit-Card Registry that Bellyflopped this Year, Is Drawing some Bottom-Fishers, The Wall Street Journal, Aug. 21, 1995, pp. C2.
"Japan's JAAI system appraises used cars over internet", Asia Pulse, Mar. 3, 2000.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Leskovec, Jure; "Social Media Analytics: Tracking, Modeling and Predicting the Flow of Information through Networks"; WWW 2011-Tutorial; Mar. 28-Apr. 1, 2011; Hyderabad, India; pp. 277-278.
LifeLock; "How can LifeLock protect my kids and family?," http://www.lifelock.com/lifelock-for-people/how-we-do-it/how-can-lifelock-protect-my-kids-and-family, accessed Mar. 14, 2008.
Loshin, Intelligent Enterprise: Better Insight for Business Decisions, "Value-Added Data: Merge Ahead", Feb. 9, 2000, vol. 3, No. 3, 5 pages.
Magid, Lawrence, J. , Business Tools: When Selecting an ASP Ensure Data Mobility, Los Angeles Times, Feb. 26, 2001, vol. C, Issue 4, pp. 3, Los Angeles, CA.
Miller, Joe, "NADA used-car prices go online", Automotive News, Jun. 14, 1999, p. 36.
"PremierGuide Announces Release 3.0 of Local Search Platform", Business Wire, p. 5574, Palo Alto, CA, Mar. 4, 2004.
"Qualifying for Debt Settlement", http://www.certifieddebt.com/debt/settlement-qualifications.shtml printed Jan. 9, 2013 in 2 pages.
Ramaswamy, Vinita M., Identity-Theft Toolkit, The CPA Journal, Oct. 1, 2006, vol. 76, Issue 10, pp. 66-70.
"Resolve Debt for Less: With Help from Freedom Financial" http://www.debtsettlementusa.com/ printed Jan. 9, 2013 in 6 pages.
Sawyers, Arlene, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
"Settling Your Debts—Part 1 in Our Debt Settlement Series", http://www.creditinfocenter.com/debt/settle_debts.shtml printed Jan. 9, 2013 in 6 pages.
Tao, Lixin, "Shifting Paradigms with the Application Service Provider Model"; Concordia University, Canada; IEEE; Oct. 2001.
Vamosi, Robert, "How to Handle ID Fraud's Youngest Victims," Nov. 21, 2008, http://news.cnet.com/8301-10789_3-10105303-57.html.
"WashingtonPost.com and Cars.com launch comprehensive automotive web site for the Washington area", PR Newswire, Oct. 22, 1998.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US10/34434, dated Jun. 23, 2010.

* cited by examiner

FIG. 5B

APPLICATION CLUSTERS

CROSS-REFERENCE TO RELATED APPLICATIONS

This application claims the benefit of U.S. provisional application No. 61/413,294, filed Nov. 12, 2010 the disclosure of which is hereby incorporated by reference in its entirety.

BACKGROUND

Generally, consumers may maintain accounts with one or more service providers. Service providers may include, for example, financial service providers (e.g., banks, brokerages, lenders, budgeting, planning, educational, etc.), social networking services, entertainment services, healthcare service providers, personal information providers, etc. Some of the service providers may offer a website that consumers may visit to modify, update, or add to the personal information maintained by the service provider. In addition, some service providers may provide information related to the consumers' accounts through their web sites. For example, a bank may offer a web site where consumers can update their address and view recent account activity. Service providers may also offer the consumer the ability to interact with his or her account. For example, service providers may provide functionality that offers consumers the ability to make payments on their account. Some service providers, such as social networking sites, may allow for consumers to communicate with other account holders through the service providers' website.

SUMMARY

In one aspect, a method for displaying data from multiple data sources is described. A computer system may access one or more data elements from a first source and may also access one or more data elements from a second source. The computer system may create elemental data by identifying primary data elements from first source data, wherein the data type of the first primary data elements do not match the data type of any of one or more second source data elements, identifying second primary data elements from the second source data wherein the data type of the second primary data elements do not match the data type of any of the one or more first source data elements, and resolving any conflicting data from the first and second sources. The computers system may then create derived data based at least in part on the elemental data and may also generate a user interface comprising at least some of the elemental data and at least some of the derived data.

In another aspect, a method of sharing data between websites that provide varying data regarding consumers is described wherein the method comprises receiving varying data regarding a consumer from a plurality of websites, determining derived data indicative of personal financial information of the consumer that is not received from any of the individual at least two of the websites, storing the derived data indicative of personal financial information so that the at least two of the websites have access to the derived data, and providing a user interface that includes at least some of the data from the at least two of the websites and at least some of the derived data.

In yet another aspect, a system is described that may access first source data from a first data storage, access second source data from a second data storage, identify primary data from the first source data and the second source data, wherein the primary data is not in conflict, identify conflicting data from the first source data and the second source data, resolve the conflicting data to identify resolved data by choosing data from either the first source data or the second source data, create derived data based at least in part on the primary data and the resolved data, and generate a user interface displaying at least some of either the primary data, the resolved data or the derived data.

BRIEF DESCRIPTION OF THE DRAWINGS

FIG. 5B shows another embodiment of a user interface containing application clusters for display on a personal computer.

DETAILED DESCRIPTION

Figure 1A:
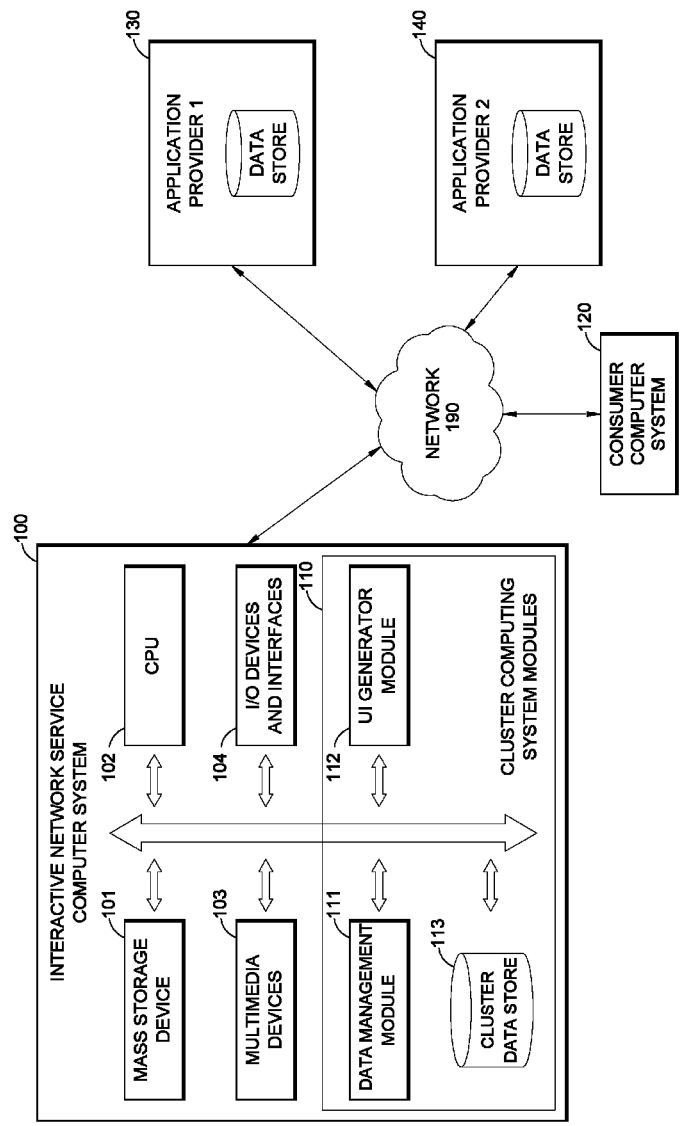
FIG. 1A shows one embodiment of an interactive network service computer system in communication with two application provider systems and a consumer computer system over a network.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Consumers can access their personal information or account information by visiting separate service provider websites, for example. If the consumer wishes to modify her personal information, she may individually visit the websites of the service providers and enter the same information several times. Further, since there is generally no integration between service providers, access to data that may be derived from the data maintained by the service providers individually may be non-existent and inaccessible to consumers.

Overview

The embodiments of the disclosure relate to an interactive service that provides one or more application clusters to a consumer. An application cluster is a group of applications that allow a consumer to interact with personal data of the consumer held with multiple service providers. In one embodiment, service providers provide custom applications that are included in one or more application clusters and are configured to provide personal information of consumers. For example, applications may include software code that interfaces with one or more data structures of a service provider, and is usable to generate a user interface that displays personal information of the user that is held by the particular service provider that provided the applications (referred to herein as an "application provider"). Application providers may include, for example, financial service providers (e.g., banks, brokerages, lenders, budgeting, planning, educational, etc.), healthcare service providers, personal information providers, etc., as well as agents of the service providers, such as third-party entities that may provide applications for accessing data of one or more service providers. The term "application provider," as used herein, refers to a service provider that also provides an application that may be part of an application cluster, regardless of whether the service provider provides the application itself or the application is provided by a third party, such as an agent of the service provider.

Applications (from different application providers) of an application cluster may advantageously be displayed side-by-side on a consumer's computer system in order to concurrently provide information from multiple application providers. Generally, application clusters may be organized by a common theme. For example, a consumer may have a personal finance application cluster with banking, budget and payment applications for the consumer's various finance accounts. A consumer may also have application clusters directed toward sports, fitness, diet, time management and the like.

In one embodiment, an application cluster includes multiple applications (displaying information from multiple application providers) in a web browser or dedicated computer application specifically designed to display the application clusters. The interactive service may provide a standard application program interface, or API, so that applications within an application cluster render with a standard interface and using a similar look and feel. The API may also allow application providers to share data, thereby providing data integration between applications of the cluster. In some embodiments, the interactive service may use the shared data provided by the application providers (including shared data) to create and manage derived data. The derived data may be displayed to the consumer in a user interface provided by the interactive service. Consumers may edit or modify data using applications within the cluster. The interactive service may then communicate any modified data to the one or more application providers, such as based on sharing permissions that are established by the business entities and/or the interactive service.

Examples of System Architectures

FIG. 1A shows one embodiment of an interactive network service computer system ("interactive service") 100 in communication with an application provider 1 computer system 130 ("first application provider"), an application provider 2 computer system 140 ("second application provider"), and a consumer computer system 120 over network 190. The interactive service 100 may be a computer system that creates and manages application clusters. As described herein, the application clusters are advantageously provided to the consumer computer system 120 so that a consumer may interact with the one or more application providers 130, 140 through the user interfaces of the application cluster. The consumer computer system 120 may be a computer system operated by a consumer that permits access to the interactive service 100 allowing the consumer to access the interactive service 100 to view, and interact with, data displayed in the application clusters. The application providers 130, 140 may provide data and user interface rending information to the interactive service through an API provided to the application providers by the cluster computing system modules 110 of the interactive service 100.

In one embodiment, the system outlined in FIG. 1A is computerized, wherein each of the illustrated components comprises a computing device that is configured to communicate with other computer devices via network 190. For example, the consumer computing system 120 may comprise a computing device, such as a desktop, notebook, or handheld computing device that is configured to transmit and receive data to/from other computing devices via network 190. Similarly, each of the interactive service 100 and the application providers 130, 140 may include one or more computing devices that are configured to communicate data with other computing devices via network 190. Depending on the embodiment, network 190 may comprise one or more of any type of network, such as one or more local area networks, wide area networks, personal area networks, telephone network, and/or the Internet, which may be accessed via any available wired and/or wireless communication protocols. Thus, network 190 may comprise a secure LAN through which the interactive service 100 and the application providers 130, 140 communicate, and network 190 may further comprise an Internet connection through which the interactive service 100 and the consumer computing system 120 communicate. Any other combination of networks, including secured and unsecured network communication links, are contemplated for use in the systems described herein.

In one embodiment, the consumer computer system 120 may access the interactive service 100 through the use of a web browser. For example, the interactive service 100 may execute a web server hosting a web page, or web portal. The consumer computer system 120, through the use of a web browser, may connect to the web server and the application clusters may be displayed as components within a web page. In some embodiments, the web server of interactive service 100 is configured to generate web pages based on the display of consumer computer system 120. For example, if consumer computer system 120 is a mobile device, such as a cellular telephone, the web server of the interactive service 100 may generate a web page configured to display in a small area. By way of another example, if the consumer computer system 120 is a laptop or PC desktop, the web server of the interactive service 100 may generate a web page that is configured to display in a standard resolution such as 1280 by 1024 pixels, for example.

FIG. 1A illustrates one embodiment of the interactive service 100. In the illustrative embodiment of FIG. 1A, the interactive service 100 is configured to interface with multiple devices and/or data sources and may be used to implement certain systems and methods described herein. For example, the interactive service 100 may be configured to receive data from the first and second application providers 130, 140, resolve conflicting data between the first and second application providers, create data derived from data received from the first and second application providers 130, 140, generate user interface information for displaying the received and derived data, and transmitting the user interface information to the consumer computing system 120. The functionality provided for in the components and modules of the interactive service 100 may be combined into fewer components and modules or further separated into additional components and modules.

In general, the word module, as used herein, refers to logic embodied in hardware or firmware, or to a collection of software instructions stored on a non-transitory, tangible computer-readable medium, possibly having entry and exit points, written in a programming language, such as, for example, C, C++, C#, or Java. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules may be stored in any type of computer-readable medium, such as a memory device (e.g., random access, flash memory, and the like), an optical medium (e.g., a CD, DVD, BluRay, and the like), firmware (e.g., an EPROM), or any other storage medium. The software modules may be configured for execution by one or more CPUs in order to cause FHV meter 100 to perform particular operations.

It will be further appreciated that hardware modules may be comprised of connected logic units, such as gates and flip-flops, and/or may be comprised of programmable units, such as programmable gate arrays or processors. The modules described herein may be implemented as software modules, but may also be implemented in hardware or firmware. Generally, the modules described herein refer to logical modules that may be combined with other modules or divided into sub-modules despite their physical organization or storage.

In one embodiment, the interactive service 100 includes a computing system that may have one or more computing devices (e.g., computers). The interactive service 100 may include, for example, a single computing device, a computer server, a smart storage unit, or a combination of one or more computing devices and/or computer servers. Depending on the embodiment, the components illustrated in the interactive service 100 may be distributed amongst multiple devices, such as via a local area or other network connection. In other embodiments the interactive service 100 may include fewer and/or additional components that are illustrated in FIG. 1A.

In one embodiment, interactive service 100 may be a computing system that is IBM, Macintosh or Linux/Unix compatible and may include one or more central processing units ("CPU") 102 which may include one or more conventional or proprietary microprocessors such as, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, for example. The interactive service 100 may further include mass storage device 101, such as random access memory ("RAM") temporary storage of information and read only memory ("ROM") for permanent storage of information, and cluster data store 113, such as a hard drive, diskette, or optical media storage device. In certain embodiments, cluster data store 113 stores derived data or logic that may be used to broker data among application providers. Embodiments of cluster data store 113 may store data in databases, flat files, spreadsheets, or any other data structure known in the art. Typically, the modules of interactive service 100 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, interactive service 100 leverages computing and storage services available over the Internet (cloud computing).

The interactive service 100 is generally controlled and coordinated by operating system software, such as the Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, IBM® OS/2® operating systems, or other compatible operating systems. In another embodiment, interactive service 100 may be controlled by a proprietary operating system. Conventional operating systems control and schedule computer processes for execution, perform memory management, provide file system, networking, and I/O services, and may provide a user interface, such as a graphical user interface ("GUI") for display, among other things.

The interactive service 100 may include one or more commonly available I/O devices and interfaces 104, such as for example, a printer, buttons, a keyboard, a trackball, a mouse, drawing tablets, joysticks, game controllers, touchscreens (e.g., capacitive or resistive touchscreen), touchpads, accelerometers, LED displays, monitors, USB ports, RS 232 ports and the like. In one embodiment, I/O devices and interfaces 104 include one or more display devices. In the embodiment of FIG. 1, I/O devices and interfaces 104 provide a communication interface to various external devices. For example, interactive service 100 is in communication with a network 190, such as any combination of one or more LANs, WANs, or the Internet, for example, via a wired, wireless, or combination of wired and wireless, connections via a network interface of I/O devices and interfaces 104 and may also include ports for sending and receiving data such as a USB port or an RS 232 port, for example. The interactive service 100 may also include one or more multimedia devices 103, such as a display device (also referred to herein as a display screen), which may also be one of the I/O devices 104 in the case of a touchscreen, for example. Display devices may include LCD, OLED, or other thin screen display surfaces, a monitor, television, projector, or any other device that visually depicts user interfaces and data to viewers. The interactive service 100 may also include one or more multimedia devices, such as speakers, video cards, graphics accelerators, and microphones, for example.

In one embodiment, the interactive service 100 may be a computer system that contains clustering computing system modules ("clustering modules") 110. The clustering modules 110 advantageously perform operations related to managing data from one or more data sources. For example, clustering modules 110 may manage data from the first application provider 130 and the second application provider 140 by resolving conflicts between the application providers and by deriving data from data received from the application providers. The clustering modules 110 may also generate user interfaces for displaying the managed data. For example, clustering modules 110 may generate application cluster user interfaces such as the example user interfaces of FIG. 5A and FIG. 5B. The functions, operations, and methods performed by the clustering modules 110 are described in greater detail with respect to FIG. 3, FIG. 4, FIG. 6 and FIG. 7.

In some embodiments, the first and second application provider systems 130, 140 may be operated by entities that operate a website offering consumer services. For example, the application providers 130, 140 may be operated by banks, financial institutions, credit bureaus, personal computing software providers, credit monitoring services, social networking websites, government entities, job search sites, or any other entity that may a website related to consumer services or maintain data associated with consumers. The first and second data providers 130, 140 may obtain data directly from consumers. For example, the first and second data providers may host websites that allow consumers to manually enter data such as addresses, phone numbers, and interests, for example. In addition, the first and second data providers 130, 140 may receive data from other computing systems that manage data such as credit bureau computing systems, banking computing systems, or government entity computer systems, for example. As described with respect FIG. 2 and FIG. 7, first and second data providers 130, 140 may also receive data from the clustering modules 110.

In one embodiment, the first and second application providers 130, 140 may provide user interface rending information to the clustering modules 110. The user interface rendering information may provide details or instructions for how the UI generator module 112 may generate, or render, the user interfaces that display data that is received from the first and second data providers 130, 140 in an application, or widget, that is part of the application cluster. In some embodiments, the application providers 130, 140 may provide user interface rendering information for shared data, derived data, or data that the one application provider may know is available from another application provider. In one embodiment, the user interface rendering information may be provided to the UI generator module 112 through an API provided to the first and second application providers. For example, the API may accept as a parameter an object that implements an interface containing methods for drawing the user interface elements of the application or widget. It another embodiment, the API may accept an HTML file laying out the user interface elements of the application or widget, for example.

Figure 1B:
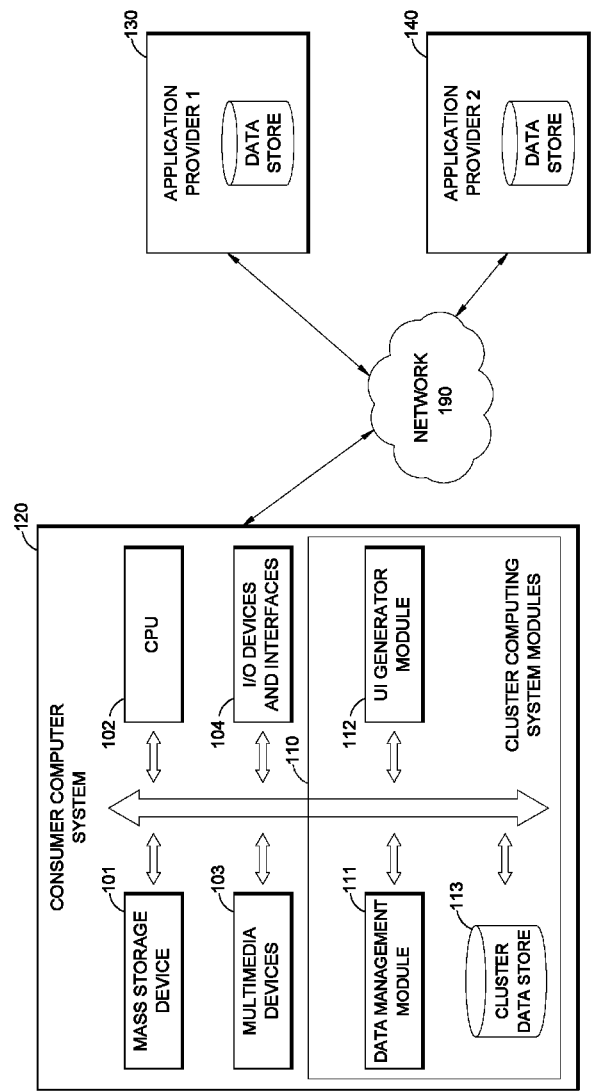
FIG. 1B shows one embodiment of a consumer computer system with clustering computing system modules in communication with two application provider systems over a network.

FIG. 1B shows one embodiment of a consumer computer system 120 comprising clustering computing system modules 110 in communication with two application provider systems 130, 140 over network 190. As described above, the consumer computer system 120 may be a computer system operated by a consumer. In the embodiment of FIG. 1B, consumer computer system may include cluster computing system modules 110 such as data management module 111, UI generator module 112, and cluster data store 113. The cluster computing system modules 110 that are part of the consumer computer system 120 may advantageously perform similar functions, operations, and methods as the cluster modules 110 that are part of interactive service 100 as described with respect to FIG. 1A. For example, the cluster modules that are part of consumer computer system 120 may perform operations related to managing data from one or more data sources such as the first application provider 130 and the second application provider 140. The clustering modules 100 may also generate user interfaces for displaying the managed data. For example, clustering modules 100 may generate application cluster user interfaces such as the illustrative user interfaces of FIG. 5A and FIG. 5B. The functions, operations, and methods performed by the clustering modules 110 of consumer computer system 120 are described in greater detail with respect to FIG. 3, FIG. 4, FIG. 6 and FIG. 7.

In one embodiment, the consumer computer system 120 includes a computing system that may have one or more computing devices (e.g., computers). The consumer computer system 120 may include, for example, a single computing device, a computer server, a smart storage unit, or a combination of one or more computing devices and/or computer servers. Depending on the embodiment, the components illustrated in the consumer computer system 120 may be distributed amongst multiple devices, such as via a local area or other network connection. In some embodiments, the consumer computer system 120 may be a mobile device, smartphone, tablet computing device, or other portable computing device. In other embodiments the consumer computer system 120 may include fewer and/or additional components that are illustrated in FIG. 1B. Certain components of consumer computer system 120 may be of similar structure and features, and may perform similar methods and functionality, as those components of interactive service computer system 100 that have the same reference number. Thus, in various embodiments, functionality described below with reference to the data management module 111, UI generator module 112, and cluster data store 113 may be partially or entirely performed on the consumer computer system 120, such as a mobile computing device of the consumer.

Configuration of Application Clusters and Data Sharing Properties

Figure 5A:
FIG. 5A shows one embodiment of a user interface containing application clusters for display on a personal computer.
Figure 5B:
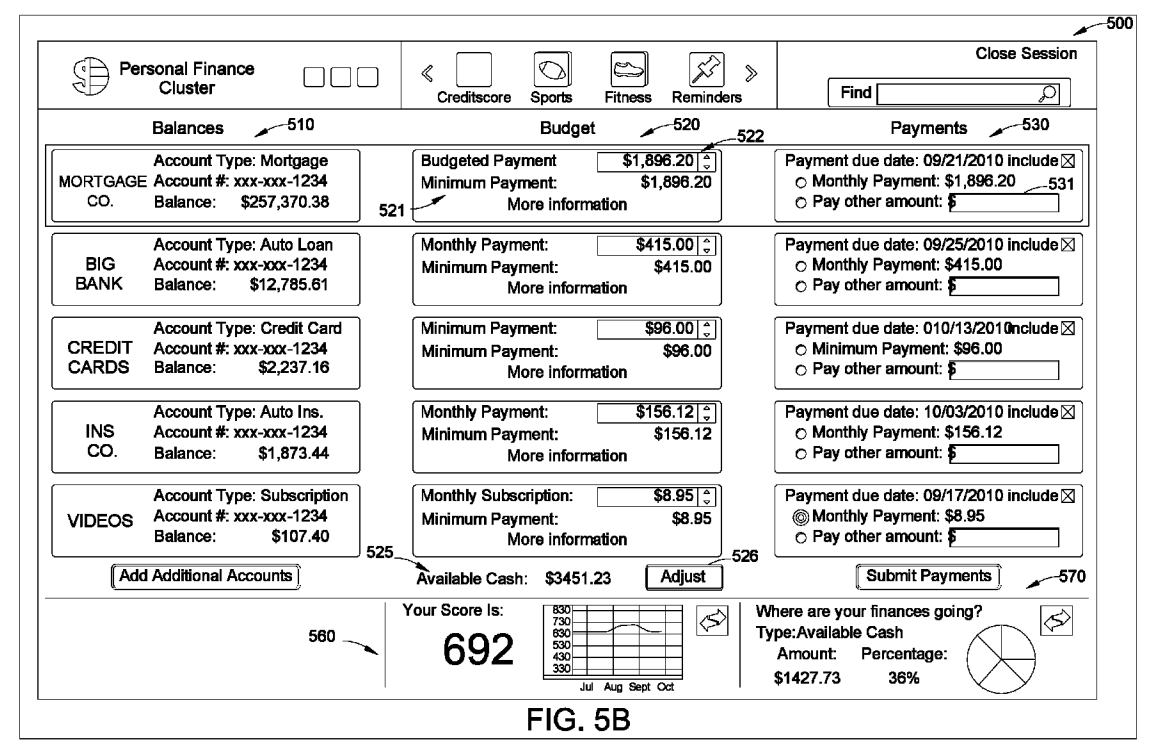

The clustering computer system modules 110 (or "clustering modules") provide the ability for a consumer to select one or more applications, or user interface widgets, corresponding to one or more application providers for display in a common user interface, such as the user interfaces illustrated in FIGS. 5A and 5B. The applications collectively may be referred to as an "application cluster." The applications within the cluster may advantageously share data. As described in further detail below, the sharing of data between the applications in the cluster is dependent upon the applications that are in the cluster and data sharing properties set for each application in the cluster. In some embodiments, the clustering modules 110 may provide one or more applications displaying primary data and one or more applications displaying derived data. As used herein, primary data refers to data that is directly received from an application provider. For example, an application provider associated with a credit card account may provide primary data in the form of a current balance on a credit card. Derived data, on the other hand, is data calculated, created, or derived by the data management module 111 from primary data. For example, if multiple application providers provide minimum monthly payment data regarding respective user accounts, data management module 111 may calculate derived data in the form of an overall monthly debt obligation value, which may be the sum of all minimum monthly payments received from the multiple application providers. For example, if a consumer has a minimum monthly payment of $1000 to "Mortgage Co.", a recurring monthly payment to "Insurance Co." for $300 and a recurring monthly payment of $20 to a video rental service, the data management module 111 may receive the primary data of the monthly payment amounts from "Mortgage Co.", "Insurance Co." and the video rental service application providers and calculate an overall monthly debt obligation, which is derived data, of $1320. Derived data may also be calculated or aggregated from one data source that contains information about a plurality of accounts of a consumer. For example, an application provider may be a credit bureau that provides a credit report as data to the data management module 111. The data management module 111 may then create derived data based on the data that contained within the credit report. It can be appreciated that the calculation of derived data may be dependent upon the application providers that are part of the cluster, the data sharing properties of the application providers, and the data sharing properties of the primary data.

In one embodiment, a user of consumer computer system 120 (the "consumer") may select from one or more application clusters with which the consumer would like to interact. For example, the consumer may be able to select a "personal finance" cluster that may display applications related to the consumer's personal finances. The application cluster may represent a group of applications with a consistent theme. For example, if a consumer selects a "sports" cluster, the applications within the cluster may relate to the consumer's interest in sports, such as a display of box scores, fantasy leagues updates, and sports news items, for example.

In one embodiment, the consumer may select or configure the set of applications in the application cluster. For example, the consumer may be able to select applications for displaying information from her bank, mortgage company, credit card company, or video rental service for addition to the personal finances application cluster. In one embodiment, the clustering computing system modules 110 may provide a list of applications that are typical for the application cluster. The list may include the application providers that have provided user interface rendering information and data to the clustering computing system modules 110. For example, if the consumer has indicated that they would like to include the "social network" application cluster, and if application provider "personalsocialnetwork.com" has provided application data and user interface data to clustering modules 110, the clustering modules 110 may include "personalsocialnetwork.com" in the list of applications that may be added to the "social network" cluster. If the consumer has an account with "personalsocialnetwork.com" she may chose to add the "personalsocialnetwork.com" application to her "social network" application cluster.

In another embodiment, the clustering modules 110 may provide the ability for a user to search for available applications for including within her application cluster. For example, the clustering modules 110 may provide a search interface comprising a text field allowing a user to enter the name of an application provider. Once entered, the clustering modules 110 may display a list of application providers that may match the entered search terms. For example, if a user enters "Big Bank" into the search text field, and "Big Bank" has provided application data to the clustering modules 110, applications associated with "Big Bank" may be displayed. In another embodiment, the user may enter the terms "mortgage company," and a list of mortgage companies that have provided application data to the clustering modules 110 may be provided to the user. If the consumer's mortgage company has provided application data to the clustering modules 110, the consumer may have the option of including the consumer's mortgage company's application within one of her application clusters, such as the personal finance application cluster, for example.

In one embodiment, the clustering modules 110 advantageously communicate with the application providers 130, 140 to determine the consumers that may hold accounts with the application providers 130, 140 so that consumers may search for available applications to add to their cluster based on their identification information. For example, the clustering modules 110 may provide a user interface comprising a text field for entry of the consumer's email address. Once the consumer enters her email address, the clustering modules 110 may communicate with the application providers 130, 140 to determine if any of the application providers have an account with the consumer's email address. If the clustering modules 110 confirm the existence of an account with one or more of the application providers, a list of applications corresponding to the application providers may be provided so that the consumer can add the applications to the one or more of the consumer's application clusters. By way of example, suppose a consumer has accounts with "socialnetwork.com" and "Big Bank." Suppose further that "socialnetwork.com" and "Big Bank" are application providers to the clustering modules 110. The consumer may enter her email address, "consumer@mail.com", in the search text field provided by clustering computing modules. The clustering computing modules 110 may contact "socialnetwork.com" and "Big Bank" to determine if they have accounts with an email address matching "consumer@mail.com." "Big Bank" and "socialnetwork.com" may then provide an indication to clustering computing modules 110 that they have accounts matching "consumer@mail.com." Clustering computing modules 110 may then provide the option to the consumer to add the "Big Bank" application and the "socialnetwork.com" application to the consumer's application clusters. For example, the consumer may choose to add a "Big Bank" application to her personal finance application cluster and a "socialnetwork.com" application to her social networking application cluster.

Although the example above described entering an email address as a consumer identifier for the purposes of finding applications available to the consumer to add to her application clusters, it is understood that other identifiers may be used to determine if the consumer has accounts with the application providers 130, 140. For example, a consumer may be able to search for applications based on their first and last name, address, phone number, or other identifier associated with consumer that may be included in the consumer's profile with the application providers 130, 140.

In some embodiments, once the consumer has selected an application to include in an application cluster, the clustering computing modules 110 may request the consumer to set data sharing properties related to the application. The clustering computing modules 110 may use the data sharing properties selected by the consumer to broker data among the application providers 130, 140. Data sharing properties may be configured at the application level. For example, a consumer may set the data sharing properties for a first application to "share," indicating that data from the first application may be shared with other applications and may set the data sharing properties for a second application to not share, indicating that the data from the second application may not be shared with other applications. By way of example, suppose that the consumer has three applications in her finance application clusters: (1) "Credit Report—lenders"; (2) "Budgeting.com" and (3) "Bank—bill pay." The consumer may wish to share data between "Budgeting.com" and "Bank—bill pay", but may wish to keep the data of "Credit Report—lenders" private. Accordingly, the consumer can set the data sharing properties of "Budgeting.com" and "Bank—bill pay" to share data and the data sharing properties of "Credit Report—lenders" to not share. In some embodiments, the data sharing properties may be set to indicate that an application may only share data with other applications within its cluster. For example, the application of the finance cluster may only share data with other applications within the cluster. The clustering computing modules 110 may provide a user interface to consumer computer system 120 to set the data properties. The user interface may contain, for example, radio buttons, dropdown boxes, checkboxes or other choice selection user interfaces that would allow a consumer to select the data sharing properties of applications. For example, the clustering computing modules 110 may provide a user interface list that lists all of the applications in a consumer's application cluster. Each application in the list may have associated with it, a radio button group comprising a "Share", "Share with Cluster Only" or "Do Not Share" radio buttons. Using the radio buttons, the consumer can set the data sharing properties for each application. It can be appreciated that many different user interfaces elements may be used to set data sharing properties for one or more applications within the consumer's application cluster.

In one embodiment, the clustering modules 110 may provide a user interface that allows a consumer to select which data elements from the application providers 130, 140 may be shared once the consumer has indicated that data from the application providers 130, 140 is to be shared. Illustratively, using the example above, suppose the consumer sets the data sharing properties of "Credit Report—lenders" to "Share with Cluster Only." The UI generator module 112 may generate a user interface displaying those data elements that may be shared with other applications in the "finance" cluster. For example, the UI generator module 112 may display, for "Credit Report—lenders", data fields such as first name, last name, home address, business address, phone number, e-mail, lender names, lender terms, lender account balances. Similar to the setting of data sharing properties for applications, the user interface may contain, for example, radio buttons, dropdown boxes, checkboxes or other choice selection user interfaces that would allow a consumer to select the data sharing properties of the data elements of shared applications.

In some embodiments, the clustering computing modules 110 may provide a user interface allowing the consumer to provide a data sharing priority for the applications within the consumer's cluster. The data sharing priority may, for example, provide a decision rule to the data management module 111 when there is a conflict in the data shared among application providers 130, 140. By way of example, suppose the consumer has permitted sharing for three applications: (1) "Big Bank"; (2) "PersonalSocialNetwork.com" and (3) "ProfessionalSocialNetwork.com." and that the consumer has set "Big Bank" as the highest priority data source "PersonalSocialNetwork.com" as the second highest priority data source, and "ProfessionalSocialNetwork.com." For example, the consumer may have set the data sharing priority for "Big Bank" to "1", the data sharing priority for "PersonalSocialNetwork.com" to "2" and the data sharing priority for "ProfessionalSocialNetwork.com" to "3." Also suppose that the consumer's home address data with "Big Bank" is "123 Main St.", the consumer's home address data with PersonalSocialNetwork.com is "456 $3^{rd}$ St.", and the consumer's home address with ProfessionalSocialNetwork.com is "789 Orange Ave." When the data management module 113 receives the home address data from the three application providers, it will determine that the home address data associated with "Big Bank" will be used in the application cluster display for all three application providers because the consumer has indicated that the data of "Big Bank" has the highest priority. In some embodiments, where overall highest priority application provider does not have the shared data needed for the application clusters, the data from the application provider with the highest priority for that data element may be used to resolve conflicts among application providers. Illustratively, using the example outlined above, suppose contact information for a "friend" or "connection" is to be shared among application providers. "Big Bank" would not maintain the contact information because the consumer's account with "Big Bank" does not have "friends" or "contacts." Accordingly, the clustering computing system modules may determine that data from "PersonalSocialNetwork.com", which has a priority of "2", will be used to resolve any conflicts as between "PersonalSocialNetwork.com" and "ProfessionalSocialNetwork.com." The UI generator module 112 may advantageously generate user interfaces that facilitate the setting of priorities among the application providers. For example, the UI generator module 112 may provide an ordered list of the applications in the cluster that maybe edited through drag-and-drop functionality, where applications at the top of the list represent those applications with the highest priority. Alternatively, the UI generator module 112 may provide a series of text fields next to a list of the application providers that provide data to the application cluster thereby allowing the consumer to enter an absolute priority associated with application providers.

In yet another embodiment, the UI generator module 112 may provide a radio button for each application in the consumer's application clusters that may designate an application provider as the "master" data provider. For example, if the consumer is confident that address data provided by "Big Bank" is always the most current, the consumer may select the "Big Bank" application as the "master" for the address data elements, while setting other application providers as master for other non-address data elements. In this example, if address data received from other application providers conflicts with the data provided by "Big Bank", data management module 111 will use the address data provided by "Big Bank." It can be appreciated that data source priority or master data sources may be designated and selected using a variety of user interface elements. The brokering of data and resolution of data conflicts among application providers is described in more detail with respect to FIG. 4.

Examples of Data Flow Between System Components

Figure 2:
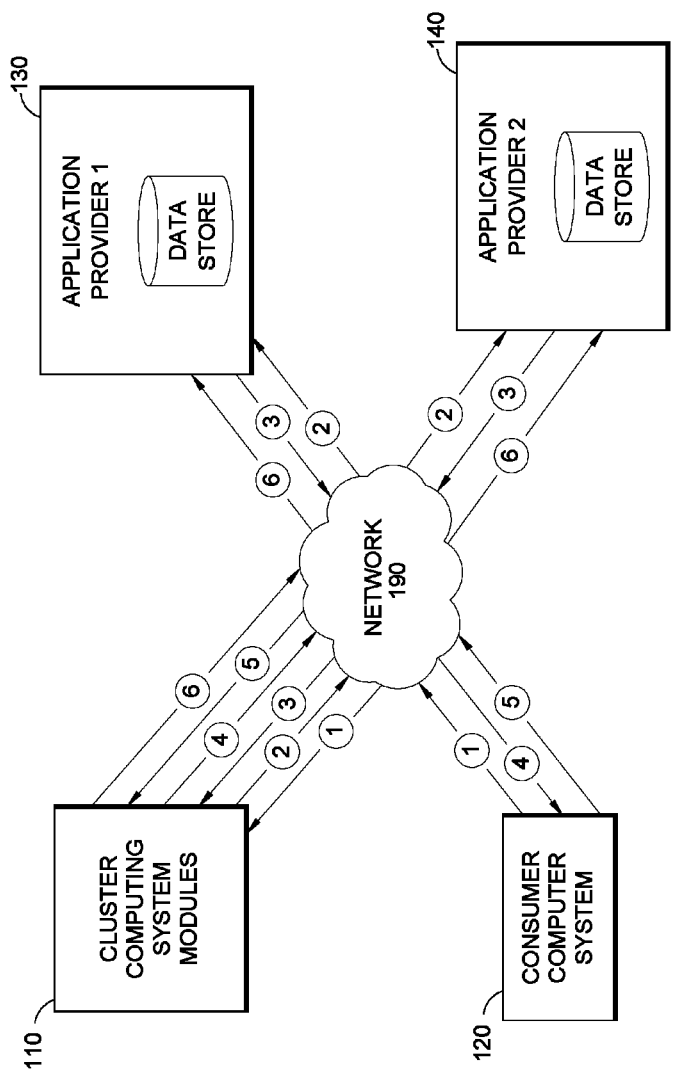
FIG. 2 shows an example of a flow of data for one embodiment of a clustering computer system modules in communication with two application provider systems and a consumer computer system over a network.

FIG. 2 shows an exemplary flow of data for one embodiment of the clustering computing system modules 110 in communication with two application provider systems 130, 140 over a network 190, and consumer computer system 120. In one embodiment, the clustering computing system modules 110 may be part of a computer system connected to the network 190, such as interactive service 100. In another embodiment, the clustering computing system modules 110 may be part of consumer computer system 120. Thus, although consumer computing system is depicted in FIG. 2 as a separate block communicating with clustering modules 110 over the network 190, it may be appreciated that the flow of data between clustering modules 110 and consumer computer system 120 may be advantageously performed between two groups of modules within the same computing system, such as the consumer computer system 120 of FIG. 1B.

At step 1 of FIG. 1, the consumer computer system 120 accesses the clustering modules 110. The cluster modules 110 may authenticate the consumer computer system 120 by, for example, requesting a user name and a password from the consumer computer system 120. In such embodiments, the clustering modules 110 may generate a user interface that is sent and displayed to consumer computer system 120 that allows the user of consumer computer system 120 to enter credentials for authentication. In other embodiments, the user may be authenticated using the systems and methods described in applicants co-pending application GLOBAL VALIDATION SYSTEM, Ser. No. 13/204,579, filed Aug. 5, 2011, which is hereby incorporated by references in it entirety.

Once the consumer has been authenticated, the clustering modules 110, at step 2, may request data from the application providers 130, 140. The application providers 130, 140 may then return data to the clustering modules 110 at step 3. The type, content, and format of the data for some embodiments of the application providers 130, 140 are described in greater detail with respect to FIG. 4.

Continuing to step 4 of FIG. 2, in one embodiment, once the clustering computing modules receives data from the application providers 130, 140, the data management module 111 may broker the received data and generate derived data. The UI generator module 112 may then generate the user interface information for an application cluster. The application cluster may include, for example, application user interfaces selected by the user as described above. The application cluster may included brokered received data and generated derived data. Once generated, the cluster modules 110 may send the user interface information for rendering the application cluster to the consumer computer system 120. Once the consumer computing system 120 receives the application cluster, the user of consumer computer system 120 (the "consumer") may be able to edit some of the primary, brokered data contained in the application cluster. When finished, the consumer computer system, at step 5, saves or commits the changes to the primary data, which is then sent back to the cluster modules 110 for processing. In step 5, the data management module 111 of cluster module 110 receives any modifications made to the primary data and pushes the modifications back out to the application providers 130, 140 at step 6. The process flow for pushing primary data modifications back out to application providers is described in greater detail with respect to FIG. 6.

Figure 3:
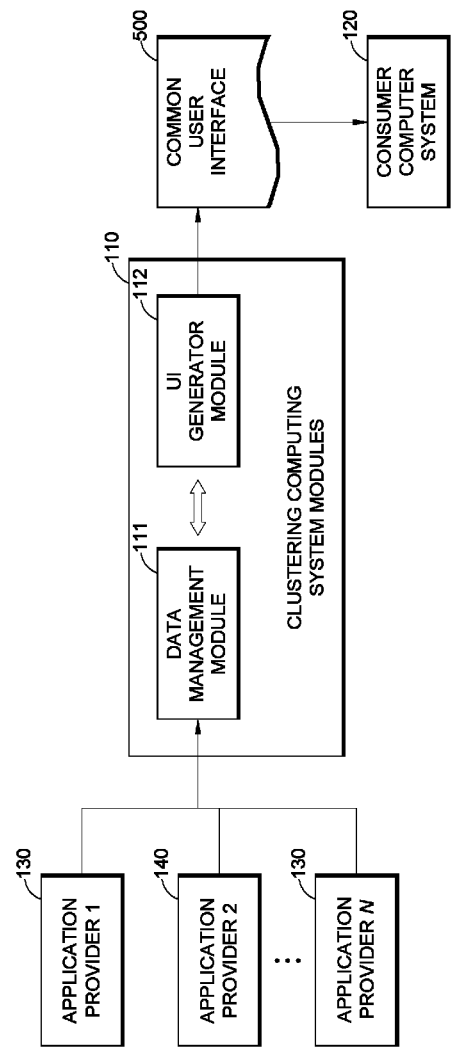
FIG. 3 shows a block diagram of one embodiment of clustering computer system modules in communication with several application provider systems and a consumer computer system.

FIG. 3 shows a block diagram of one embodiment of the clustering computer system modules 110 in communication with several application provider systems 130, 140 and the consumer computer system 120, and also illustrating the flow of data for the creation of the application clusters. As shown in FIG. 3, primary data may flow from the application providers to the data management module 111. The data management module 111 may manage the received data and may broker, or resolve, any conflicts between primary data received from the application providers. Once the data has been brokered, the brokered data is passed to the UI generator module 112. Using the brokered data, the UI generator module 112 may generate the user interfaces for the common user interface 500 (as shown, for example, in FIG. 5A and FIG. 5B). The common user interface 500 may include the brokered data. Once the brokered data is included in the common user interface 500, it is sent to consumer computer system 120 for display. In one embodiment, the consumer computer system may be a laptop, desktop, tablet PC or other general purpose computing device that is capable of executing a standard web browser. In such embodiments, the consumer computer system may comprise a display capable of displaying a standard desktop-type resolution such as, for example, 1280× 1024 pixels. Accordingly, the UI generator module 112 may generate a common user interface 500 that may be displayed in a web browser. In another embodiment, consumer computer system 120 may be a portable, hand-held computing device with limited screen resolution for display. In such embodiments, the UI generator module 112 may generate a display configured considering the limited resolution of the consumer computer system 120.

Figure 4:
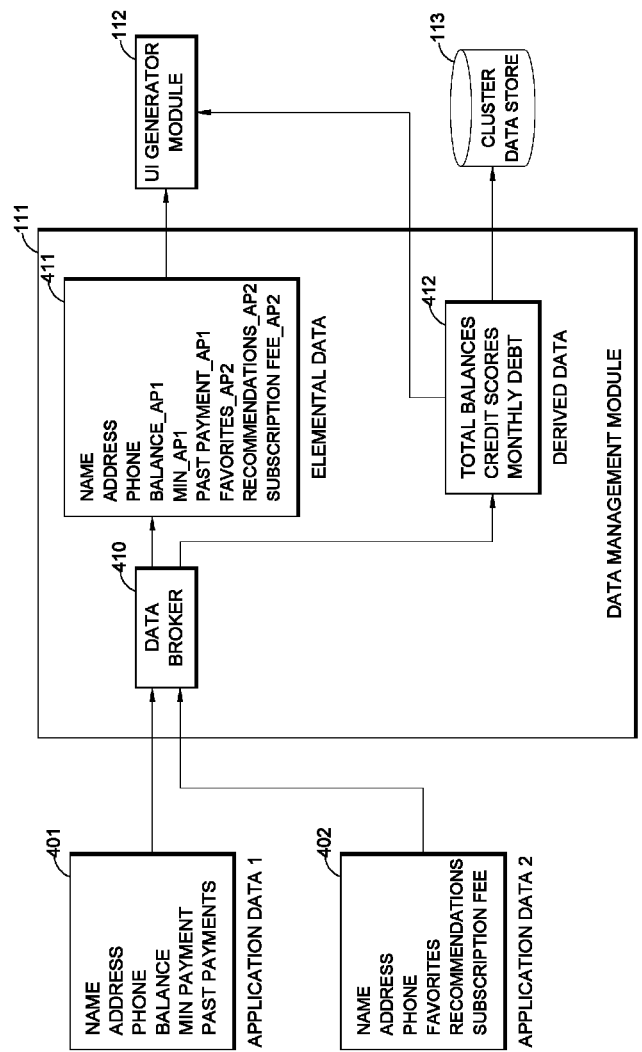
FIG. 4 shows one example of a high level data sharing schema between two application providers and the clustering computer system modules.

FIG. 4 shows one example of a high level data sharing schema between the first and second application providers 130, 140, and the clustering modules 110. The illustrative example of FIG. 4 is provided for discussion purposes and should not be construed to limit the data that may be shared among application providers in the application cluster, brokered or derived by the data management module 111. Thus, the data management module 111 may manage more data, or less data, than is shown in FIG. 4. Further, while the illustrative example of FIG. 4 shows application data from two application providers, it can be appreciated that application data may be received from more than two application providers.

FIG. 4 shows one embodiment of first application data 401 and second application data 402. The first application data 401 of FIG. 4 shows data elements that represent the primary data that may be provided by a first application provider 130, which may be a credit card company, for example. Illustratively, the first application data comprises the data elements name, address, phone, balance, min payment, and past payments. The second application data 402 shows data elements that represent the primary data that may be provided by a second application provider 140, which may be a video rental service. Illustratively, the second application data comprises the data elements name, address, phone, favorites, recommendations and subscription fee.

In one embodiment, as the data management module 111 receives the first application data 401 and the second application data 402, a data broker 410 may broker the received application data. The data broker 410 may be a module that advantageously maps primary application data to the elemental data that will subsequently be displayed in an application cluster. The data broker 410 may also calculate derived data that is based at least in part on the elemental data. The derived data may be displayed in the application cluster and it also may be stored in the cluster data store 113.

In one embodiment, the data management module 111 may manage common elemental data which can be data that is common across application providers. For example, in the illustrative embodiment of FIG. 4, examples of common elemental data may be the name, address and phone elements of elemental data 411. The common elemental data may be, in some embodiments, data that is simultaneously provided by application providers and as a result, may create a data conflict. The data broker 410 may identify the data that may be common elemental data through a mapping of data provided by the application providers. In one embodiment, data management module 111 exposes an API that allows application providers 130, 140 to map their primary data to a common elemental data field. For example, the API may accept an object that comprises several set methods thereby allowing the application providers to set data values for the common elemental data. For example, if name, address and phone number are common data element fields that may be mapped, the API may accept a data object that comprises a setName method, a setAddress, and a setPhone method. In another embodiment, the mapping between primary data elements of the application providers and the common elemental data may be accomplished through the use of an XML schema. It can be appreciated that other methods of mapping data between computing systems may be advantageously used by the data management module 111.

In addition to the common elemental data, the API provided by the data management module 411 may also provide for application providers 130, 140 to provide custom data to the data management module. Custom data, as used with respect to the data mapping and the data management module 411, may be primary data originating from the application provider that may not conflict with primary data provided by other application providers. For example, in the illustrative embodiment of FIG. 4, balance, min payment, and past payments of application data 401 are custom data for the credit card company application provider. By way of further example, favorites, recommendations, and subscription fee of application data 402 are custom data for the video rental service. Providing custom data to the data management module 110 advantageously allows the data broker to include the custom data in derived data, or to add the custom data to the elemental data set that is provided to the UI generator module 112 to create the common user interface 500 that displays the application clusters.

In one embodiment, the API may provide a flag or mechanism for associating custom data with derived data. The flag or mechanism may advantageously provide data broker 410 with an indication that the custom data is to be included in the calculation of a derived data element. For example, in the illustrative embodiment of FIG. 4, the derived data element "Monthly Debt" may be the sum of minimum payments due to several application providers. Application data 401 comprises a "Min Payment" primary data element. The credit card company application provider that provides the application data 401 may associate the primary data element "Min Payment" with the derived data element "Monthly Debt" so that it would be included in the derived data calculation of "Monthly Debt." Further, application data 402 comprises a "Subscription Fee" primary data element. The video rental service application provider that provides the application data 402 may associate the primary data element "Subscription Fee" with the derived data element "Monthly Debt" so that it would be included in the derived data calculation of "Monthly Debt."

In one embodiment, application data may be provided by a credit bureau in the form of a credit report. In such embodiments, the data broker 410 may comprise logic that extracts data from the credit report and maps it to elemental data fields, or creates derived data that may be included in application cluster user interfaces or the cluster data store 113. For example, the personal finance application cluster may include a credit score application that provides the consumer with a simulated credit score. The simulated credit score may be derived data that is derived from primary data coming from a credit report. The data broker 410 may also map fields in the credit report to common elemental data.

In one illustrative embodiment, the data broker 410 may first process the application data by first identifying the primary data elements from the first application data 401 that do not match the primary data elements from the second application data 402, or alternatively, those primary data elements of the first application data 401 that have a different data type than the primary elements of the second application data 402. This identification may be done through the custom data mapping API. For example, in the embodiment of FIG. 4, application data 401 contains first primary data elements balance, min payment and past payments that application data 402 does not contain. Thus, the data broker 410 can advantageously map these primary data elements to elemental data 411 without concern as to conflicts in the data elements for application data 402. The data broker 410 may similarly process application data 402. For example, the data broker 410 may identify favorites, recommendations and subscription fee as primary data elements whose data type does not match the data type of any primary data elements of application data 401. Accordingly, data broker 410 can advantageously map these primary data elements to elemental data 411 without concern as to conflicts in the data elements for application data 401. As shown in the illustrative embodiment of FIG. 4, the data broker 410 may map the balance, min payment, and past payment data elements of application data 1 to the balance_ap1, min_ap1 and past payment_ap1 of elemental data 411. Further, the data broker 410 may map the favorites, recommendations, and subscription fee data elements of application data 402 to the favorites_ap2, recommendations_ap2 and subscription fee_ap2 data elements of elemental data 411.

Next, the data broker 410 may attempt to resolve any conflicts among the received application data for common elemental data. Conflicts may arise between application data due to asynchronous modifications of data that occur through the application providers. For example, a described above, the application providers 130, 140 may host websites where consumers may visit and edit data that is maintained by the application providers. A consumer may edit data that maps to common elemental data at one application provider, but not edit data that maps to the same common elemental data at a second application provider. For example, a consumer may visit a website for a credit card company application provider and update her personal address, but may not update her personal address through the website of a video rental service application provider. Subsequently, the data broker 410 may receive application data 401 from the credit card company application provider with the updated address data, and the data broker 410 may receive application data 402 with the stale address data from the video rental service application provider. The data broker 410 would then detect a conflict in the data as between the two application providers. The data broker 410 would then resolve the conflict.

In one embodiment, the data broker 410 resolves conflicts between application providers based on which application provider is the "master" for the conflicting data. By way of example, suppose that the consumer assigned the credit card company as the "master" data source for name, address and telephone number. In the event of conflicting data with the video rental service, the data broker 410 would extract the name, address and telephone data coming from the credit card company for elemental data 411. In some embodiments, the data broker 411 may maintain in cluster data store 113 a copy of application data from the master source.

In another embodiment, the data broker 410 resolves conflicts between application providers based on a consumer entered priority. As discussed above, a consumer may select a priority for determining which application data will be transferred to the elemental data 411 in the event of a conflict. By way of example, suppose that the consumer assigned the video rental service application provider as the highest priority application provider (for example, by setting the priority of the credit card application provider to "1"). When there is conflict in address data, the data broker 410 would then extract the address data element from the application data 402 associated with the video rental service application provider to resolve the conflict. The data broker 410 may select the address data from the video rental service application provider even though, as it is in this example, earlier in time because the consumer selected the video rental service application provider as the highest priority data source.

In another embodiment, the data broker 410 may resolve conflicts based on the time data was updated or modified. Considering the example above, the data broker 410 would extract the address data element from application data 401, which is associated with the credit card application provider, since in this embodiment, the most recent data prevails in the event of a conflict.

In yet another embodiment, conflicts may be resolved by asking the consumer which data to use in the application clusters in the event of a data conflict. Using the example outlined above, when there is a conflict in the address data element, the UI generator module 112 may generate a user interface asking the consumer which address data element to use, the address data element from application data 401 or the address data element from application data 402. The user interface, in some embodiments, may display the address data elements to allow the consumer to select which data is to be used as elemental data. For example, the user interface may ask if the consumer if the application cluster should use "123 Main St." as the address or "456 3$^{rd}$ St." as the address. Alternatively, the user interface may ask the consumer which application provider's data should be used to resolve the conflict. For example, the user interface may ask the consumer if the application cluster should use data from the credit card application provider or the video rental service application provider to resolve the conflict. In some embodiments, both the data and the application provider are displayed in the user interface so that the consumer may select the data that is to be used in the application cluster. For example, the user interface may ask the consumer if the application cluster should use "123 Main St. from Credit Card" or "456 3$^{rd}$ St. from Video Rental Service."

Once the elemental data 411 is determined by data broker 410, it may be passed to the UI generator 112 so that it may be displayed in application clusters. In addition, derived data 412 may be calculated. As described above, derived data 411 is data that is based at least in part on data elements of elemental data 411. The derived data 411, once calculated, may be persisted in cluster data store 113. Further, in some embodiments, the derived data 411 may be sent to the UI generator module 112 for display in the application cluster. In some embodiments, since the derived data 411 is calculated by the data broker 410, the derived data 411 may not be editable by the consumer.

Examples of User Interfaces

FIG. 5A shows one embodiment of a user interface generated by UI generator module 112 of clustering modules 110. In the illustrative embodiment of FIG. 5A, several application of the personal finance application cluster are displayed. The application cluster includes, for example, a balances application 510 (e.g., including information parsed from credit bureau application provider), a budget application 520 (e.g., including information from an online budgeting service) and payments applications 530 (e.g., including information from a bank with which the consumer has a checking account). In the illustrated embodiment, the application 510 includes information regarding accounts held by the consumers, as extracted from a credit report of the consumer, and provided by a credit bureau application. In other embodiments, an application provider may provide an application that gathers information from multiple sources, such as individually from each of "Mortgage Co.", "Big Bank", "Credit Cards", "Ins. Co." and "Videos," in order to provide the balance information of the multiple accounts with a single application.

The applications of the cluster may display elemental data such as account balances, minimum payments, and payment due dates, for example. The application cluster may also include applications for displaying derived data. For example, in the illustrative embodiment of FIG. 5A, the personal finance application cluster includes a credit score application 560 and a financial planner application 570. The credit score application 560 and the financial planner application 570 may not directly correspond with one application provider or one set of primary data from a particular application provider. Rather, the credit score application 560 and the financial planner application are applications provided by the cluster modules 110 for the purpose of displaying derived data. For example, the credit score application 560 may include a credit score that was derived from application data provided by credit bureau application provider in the form of a credit report. In some embodiments, such as the illustrative embodiment of FIG. 5A, the derived data may be read-only. For example, the data displayed in credit score application 560 and financial planner application 570 is only displayed and is not editable.

In some embodiments, data may be shared by applications. For example, in the illustrative embodiment of FIG. 5A, balance data from the balance application 510 is shared with the budget application 520. In one embodiment, a first application (e.g., application 510) may provide data regarding a particular user to a second application (e.g., application 520), without the first application displaying all of the data that is shared with the second application. By way of example, in FIG. 5A the balances application 510 shares outstanding balance data 511 with the budget application 520, but does not display the outstanding balance data. The budget application 520, however, displays the outstanding balance data 511, as well as monthly payment data for each of the listed account that may be based at least partly on the balance information. By way of further example, the balances application 510 may share data extracted from the consumer's credit report, such as payment due data 512 (such as payment due dates and minimum payment amounts), with the payments application 530. As shown in the illustrative embodiment of FIG. 5A, the payments application 530 may display the shared payment due data 512 even though the balances application 510 does not display the data. In this way, the applications can provide enhanced data to the user because an application is not restricted to use of only the data maintained by the particular application provider.

FIG. 5B shows another embodiment of a user interface generated by UI generator module 112 of clustering modules 110. In the illustrative embodiment of FIG. 5B, several applications of the personal finance cluster are displayed. The embodiment of FIG. 5B provides further examples of the types of data interactions that may be available to a consumer using the balances application 510, the budget application 520, and the payments application 530. The balances application 510 displays account information for the accounts of the consumer, such as the account type, the account number, and the current balance for the account, which may be extracted from a credit report of the consumer (in the case where the application provider of application 510 is a credit bureau or other entity that has access to credit data of the consumer). The balances application 510 may share minimum payment information 521 with the budget application 520, and the budget application 520 may display the minimum payment information 521. In addition, the budget application 520 may pre-populate the budgeted payment field 522 with the shared minimum payment information 521. The budget application may also display available cash data 525. The available cash data may be, in some embodiments, derived data that is calculated from bank account balance data received from bank applications that are part of the application cluster. For example, the bank account balance data may be provided by payments application 530 and/or other banking applications that are not shown in the embodiment of FIG. 5B.

In the embodiment of FIG. 5B, a consumer may interact with the data displayed in the budget application 520, and changes in the budget application 520 may be reflected in the payments application 530. For example, a consumer may adjust the budgeted payment field 522 to higher amount and use the budget application to determine the effect of the adjustment on her available cash, and the entered adjusted payment may be reflected in the available cash data 525. For example, a consumer may adjust the budgeted payment 522 for "Mortgage Co." from $1,896.20 to $2,500. After the consumer enters $2,500 in field 522 and presses the adjust button 526, the available cash data 525 may change from $3451.23 to $2,847.43 to reflect less available cash due to the extra payment budgeted for Mortgage Co. The payments application 530 may respond to the change in the budgeted payment field 522 by populating the pay other amount field 531 with $2,500 in order to assist the consumer in submitting a payment for the entered, budgeted, payment amount.

The illustrative embodiments of FIG. 5A and FIG. 5B are common user interfaces 500 that may be generated by UI generator module 112 for display within a standard web browser using a resolution appropriate for a desktop, laptop, tablet or other general purpose computing device such as 1280×1024 pixels for example. The illustrative embodiments of FIG. 5A and FIG. 5B may also be displayed as part of a custom client application that may be executed on consumer computer system 120, such as a, desktop, laptop, tablet or other general purpose computing device, for example.

Figure 5C:
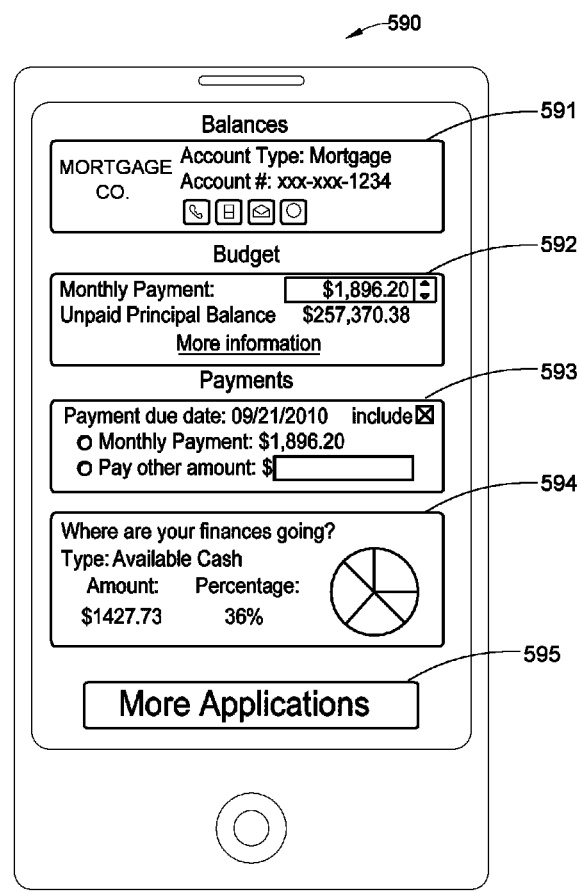
FIG. 5C shows one embodiment of a user interface containing application clusters for display on a mobile device.

FIG. 5C illustrates one embodiment of a mobile user interface 590. The mobile user interface 590 is adapted for display on a consumer computer system 120 that is a mobile device with limited resolution. The mobile user interface 590 may display only a few applications in the cluster at one time. For example, the illustrative embodiment of FIG. 5C shows a balances application 591, a budget application 592, a payments application 593 and a financial planner application 594. The applications 591, 592, 593, 594 of the mobile user interface 590 may provide similar functionality, and may share data, in a manner similar to the applications shown in the illustrative embodiments of FIG. 5A and FIG. 5B. For example, balances application 591 may share unpaid principle balance data with the budget application 592 and financial planner application 594 may display derived data. The mobile user interface 590 may provide a button 595 for viewing more applications in the cluster. In some embodiments, additional applications may be viewed using the scrolling mechanism of the mobile device such as scroll buttons or swiping, for example.

Examples of Process Flow in Operation

Figure 6:
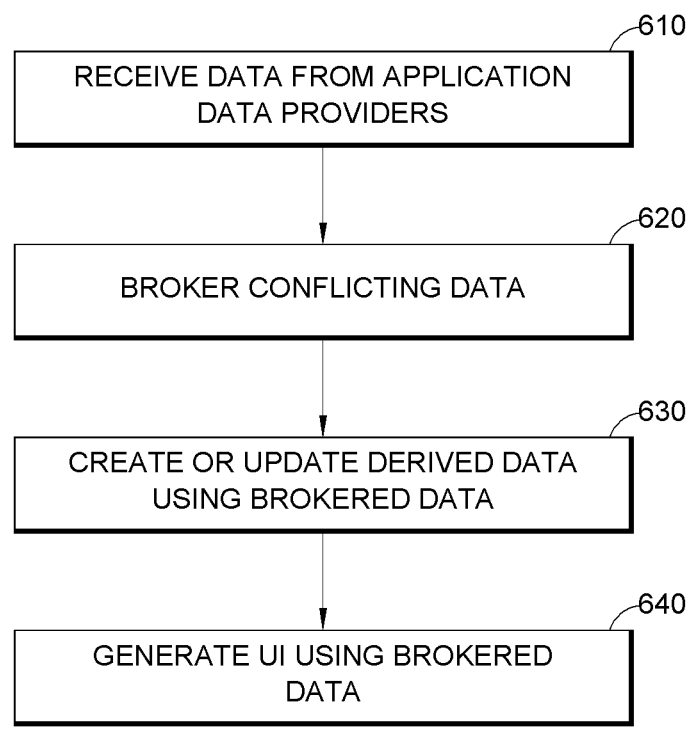
FIG. 6 shows a flow chart depicting an example of the flow of data for receiving data from application providers and generating a user interface.

FIG. 6 shows a flow chart depicting an example of the flow of data for receiving data from application providers and generating the user interface. The flow chart of FIG. 6 illustrated one embodiment of how clustering modules 110 may process the data received from application providers. Depending on the embodiment, the method of FIG. 6 may include fewer or additional blocks and/or the blocks may be performed in a different order than is illustrated. For ease of explanation, the method will be described herein as performed by the clustering modules 110, which may execute on the computer system 100, the consumer computer system 120, or any other suitable computing devices.

At block 610, the clustering modules 110 receive data from one or more application providers. Once the data is received, data management module 111 brokers any conflicting data using, for example, data brokering techniques described with respect to FIG. 4 at block 620. Once the data has been brokered, processing moves to block 630 where any derived data is created or updated. The derived data may be stored in cluster data store 113 and also may be displayed in the application cluster generated by UI generator module 112. Processing then continues to block 640 where the UI generator module 112 creates the common user interface that displays one or more application user interfaces in a cluster. As described above, the UI generator module 112 may generate the application user interfaces, or widgets, based upon data or objects submitted by application providers 130, 140 through the clustering modules 110.

Figure 7:
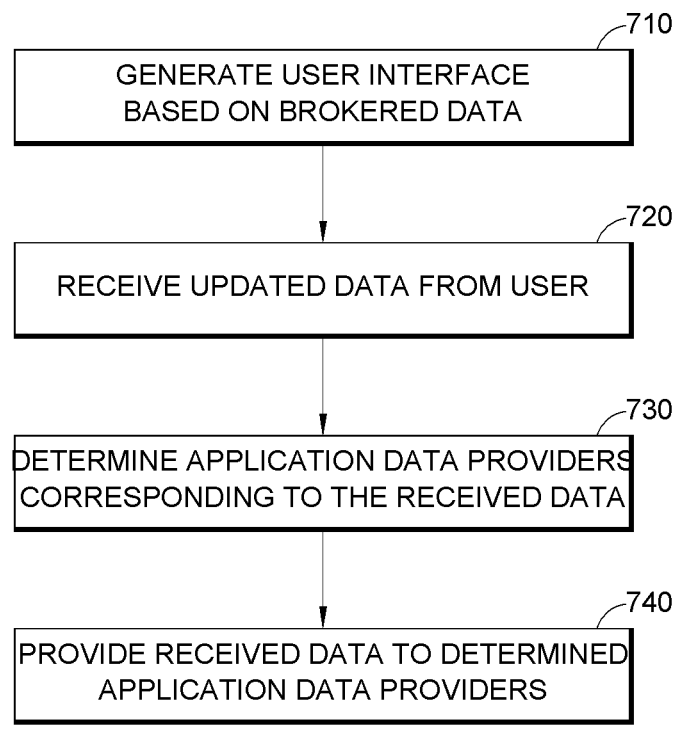
FIG. 7 shows a flow chart depicting the exemplary flow of data for managing data updates for one embodiment of clustering computer system modules where the user has updated data in a common user interface.

FIG. 7 shows a flow chart depicting the exemplary flow of data for managing data updates for one embodiment of clustering computer system where the user has updated data in the common user interface. In one aspect, the applications in the cluster of the common user interface may accept user input for modifications to primary data. For example, a consumer may wish to update her address using the application cluster, as opposed to updating her address through the web site of each application provider. Depending on the embodiment, the method of FIG. 7 may include fewer or additional blocks and/or the blocks may be performed in a different order than is illustrated. For ease of explanation, the method will be described herein as performed by the clustering modules 110, which may execute on the computer system 100, the consumer computer system 120, or any other suitable computing devices.

At block 710, the clustering modules 110 generate a user interface based on data that has been brokered from one or more application providers. The user interface may, for example, be similar to the user interfaces illustrated in FIG. 5A and FIG. 5B. Once generated, the clustering modules 110 may transmit the user interfaces to the consumer computer system 120. The consumer computer system 120 may then display the user interface and accept data modifications from the user of consumer computer system 120. Once the user is done modifying data, the consumer computer system 120 may communicate, and the clustering modules 110 may receive, the updated data at block 720. Once the data is received, the data broker 410 of data management module 111 may then determine if any changes have been made to primary data elements of the application providers at block 730. If so, then the data management module may push the updates out to the appropriate application providers at block 740.

All of the methods and tasks described herein may be performed and fully automated by a computer system. The computer system may in some cases include multiple distinct computers or computing devices (e.g., physical servers, workstations, storage arrays, etc.) that communicate and interoperate over a network to perform the described functions. Each such computing devices typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices such as solid state memory chips and/or magnetic disks, into a different state.

In addition, the methods described herein may be executed on suitable computing devices in response to execution of software instructions or other executable code read from a non-transitory tangible computer readable medium, computer readable storage or computer storage device. A computer readable medium is a data storage device that can store data that is readable by a computer system. The term "non-transitory," as used in conjunction with tangible computer readable medium, computer readable storage, computer storage device, and the like, excludes only propagating transitory signals per se from the scope of these terms. Thus, "non-transitory" does not relinquish rights to all standard computer-readable media that are not solely propagating transitory signals per se. Examples of computer readable mediums include read-only memory, random-access memory, other volatile or non-volatile memory devices, CD-ROMs, magnetic tape, flash drives, and optical data storage devices The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for displaying data received from multiple data sources that is associated with a consumer, the method comprising:
   accessing, by a computer system having one or more hardware processors, first primary data from a first application provider computer system corresponding to an account a consumer has with the first application provider;
   accessing, by the computer system, second primary data from a second application provider computer system corresponding to an account the consumer has with the second application provider, wherein the second primary data has at least some information of the consumer that is not included in the first primary data;
   generating, by the computer system, derived data based at least in part on the first primary data or the second primary data;
   generating, by the computer system, an application cluster user interface comprising a plurality of applications, the plurality of applications comprising:
      a first application corresponding to the first application provider, the first application comprising a display of at least some of the first primary data, and
      a second application corresponding to the second application provider, the second application comprising a display of at least some of the second primary data and at least some of the first primary data or data derived on the first primary data,
      wherein portions of the first primary data that are not included in the second primary data are shared with the second application provider computer system and portions of the second primary data that are not included in the first primary data are shared with the first application provider computer system, and
      wherein the first application and the second application are simultaneously viewable.

2. The method of claim 1, wherein the application cluster user interface further comprises:
   a derived data application comprising a display of at least some of the generated derived data.

3. The method of claim 2, wherein:
   the first primary data or the second primary data may be modified by the consumer through the application cluster user interface, and
   the derived data may not be modified by the consumer through the application cluster user interface.

4. The method of claim 3, further comprising:
   accessing, by the computer system, modifications made by the consumer through the application cluster user interface to the first primary data or the second primary data, and
   communicating, by the computer system, the modifications to the first application provider computer system or the second application provider computer system.

5. The method of claim 1, further comprising:
   accessing, by the computer system, third primary data from a third application provider computer system corresponding to an account the consumer has with the third application provider, wherein the third primary data has at least some information of the consumer that is not included in the first primary data or the second primary data,
   wherein the application cluster user interface further comprises a third application corresponding to the third application provider, the third application comprising a display of at least some of the first primary data, the second primary data or the third primary data, and
   wherein the first application, the second application, and the third application are simultaneously viewable.

6. The method of claim 1, wherein the first application or the second application comprise a display of at least some of the generated derived data.

7. A computing system for displaying data from multiple data sources, the computing system comprising:
   one or more hardware processors;
   a tangible computer readable storage storing instructions configured for execution by the one or more hardware processors to cause the computing system to:
      access first source data from a first entity having personal information regarding a consumer;
      access second source data from a second entity having personal information regarding the consumer that is not available to the first entity;
      identify first primary data from the first source data;
      identify second primary data from the second source data, wherein the second primary data does not contain data in conflict with the first primary data;
      identify conflicting data from the first source data and the second source data;
      resolve the conflicting data thereby generating resolved data;
      identify resolved data by choosing data from either the first source data or the second source data;
      generate derived data based at least in part on the primary data and the resolved data; and,
      generate an application cluster user interface configured to display at least some of the primary data, the resolved data or the derived data, the application cluster user interface comprising:
         first application elements displaying primary data from the first data storage and at least some of the resolved data,
         second application elements displaying primary data from the second data storage and at least some of the resolved data, and
         third application elements displaying derived data.

8. The system of claim 7, wherein:
   the application cluster user interface is configured to accept modifications to the primary data or the resolved data.

9. The system of claim 8, wherein the computer readable storage stores instructions that when executed further cause the processor to communicate the modifications to the first data storage and the second data storage.

10. The system of claim 7, wherein choosing data from either the first source data or the second source data comprises choosing the most recently edited data.

11. The system of claim 7, wherein the computer readable storage stores instructions that when executed further cause the processor to receive a data source preference from a user that may be used to resolve data conflict between the first data source and the second data source.

12. The system of claim 11, wherein choosing data from either the first source data or the second source data is based at least in part on the data source preference.

* * * * *